United States Patent
Gottlieb

(10) Patent No.: US 12,039,647 B1
(45) Date of Patent: *Jul. 16, 2024

(54) SYSTEMS AND METHODS FOR SYNTHETIC IMAGE GENERATION

(71) Applicant: CARMAX ENTERPRISE SERVICES, LLC, Richmond, VA (US)

(72) Inventor: Samuel Martin Gottlieb, Grand Blanc, MI (US)

(73) Assignee: CARMAX ENTERPRISE SERVICES, LLC, Richmond, VA (US)

( * ) Notice: Subject to any disclaimer, the term of this patent is extended or adjusted under 35 U.S.C. 154(b) by 140 days.

This patent is subject to a terminal disclaimer.

(21) Appl. No.: 17/735,515

(22) Filed: May 3, 2022

Related U.S. Application Data

(63) Continuation of application No. 17/196,062, filed on Mar. 9, 2021, now Pat. No. 11,341,699.

(51) Int. Cl.
| | | |
|---|---|---|
| *G06T 11/60* | (2006.01) | |
| *G06F 18/21* | (2023.01) | |
| *G06F 18/2433* | (2023.01) | |
| *G06N 3/045* | (2023.01) | |
| *G06N 3/08* | (2023.01) | |

(52) U.S. Cl.
CPC ......... *G06T 11/60* (2013.01); *G06F 18/2178* (2023.01); *G06F 18/2433* (2023.01); *G06N 3/045* (2023.01); *G06N 3/08* (2013.01)

(58) Field of Classification Search
CPC .. G06T 11/60; G06F 18/2178; G06F 18/2433; G06N 3/045; G06N 3/08
See application file for complete search history.

(56) References Cited

U.S. PATENT DOCUMENTS

| | | | |
|---|---|---|---|
| 10,552,714 | B2 | 2/2020 | Kiapour et al. |
| 10,719,742 | B2 | 7/2020 | Shechtman et al. |
| 11,341,699 | B1* | 5/2022 | Gottlieb ............... G06N 20/00 |
| 2017/0351935 | A1 | 12/2017 | Liu et al. |
| 2018/0075581 | A1 | 3/2018 | Shi et al. |
| 2018/0211164 | A1* | 7/2018 | Bazrafkan .............. G06N 3/045 |
| 2018/0260793 | A1* | 9/2018 | Li ........................... G06Q 40/08 |
| 2018/0314917 | A1 | 11/2018 | Mehr et al. |

(Continued)

*Primary Examiner* — John W Lee
(74) *Attorney, Agent, or Firm* — TROUTMAN PEPPER HAMILTON SANDERS LLP; Christopher J. Forstner; Scott A. Bergeson

(57) ABSTRACT

A system includes memory devices storing instructions, and one or more processors configured to execute instructions performing method steps. The method may include training a generator, encoder, and discriminator of a synthetic image generation system to enable creation of synthetic images that comply with one or more image classification requirements. A generator and discriminator may be trained in an adversarial relationship. Training may be completed when the generator outputs a synthetic image that matches a target image beyond a first predetermined threshold of accuracy and the encoder outputs a latent feature vector that matches an input latent feature vector beyond a second predetermined threshold of accuracy. After training the system may be configured to generate synthetic images that comply with one or more image classification requirements.

20 Claims, 8 Drawing Sheets

(56) References Cited

U.S. PATENT DOCUMENTS

| | | |
|---|---|---|
| 2019/0325299 A1 | 10/2019 | Oliveira Pinheiro |
| 2020/0065673 A1* | 2/2020 | Huang .................. G06N 3/047 |
| 2021/0089903 A1* | 3/2021 | Murray ............... G06F 18/2132 |

* cited by examiner

SYSTEMS AND METHODS FOR SYNTHETIC IMAGE GENERATION

CROSS REFERENCE TO RELATED APPLICATIONS

This application is a continuation of, and claims priority under 35 U.S.C. § 120 to, U.S. patent application Ser. No. 17/196,062, filed Mar. 9, 2021, the entire contents of which are fully incorporated herein by reference.

FIELD OF THE INVENTION

The present disclosure relates generally to a system implementing a novel generative adversarial network for generating synthetic images that meet certain image requirements.

BACKGROUND

With the advent of machine learning, various techniques have been employed in the study of image-to-image translation, which can be understood as a class of problems in computer vision in which the goal is to learn the mapping between an input image and an output image. Image-to-image translation may include modifying an existing image according to some desired characteristics or parameters, as well as the generation of novel images with certain desired characteristics and parameters. However, current techniques for image-to-image translation are computationally expensive, create low quality and unrealistic synthetic images, and require many training cycles for the output images to conform to specified image characteristics and/or parameters.

Accordingly, there is a need for systems and methods implementing a novel generative adversarial network that can perform image-to-image translation to generate synthetic images that meet desired image characteristics.

SUMMARY

Disclosed embodiments provide systems and methods for training and utilizing a synthetic image generator. In some embodiments, the system may include a first neural network configured to generate a synthetic image based on a latent feature vector. The system may include a second neural network configured to distinguish a real image from a synthetic image and output an image classification of the synthetic image. The system may include a third neural network configured to receive the synthetic image and recover the latent feature vector. According to some embodiments, the first neural network and the second neural network are configured to train in adversarial relationship with each other and the first neural network and the third neural network are configured to train in a collaborative relationship with each other during the training period. According to some embodiments, after completion of the training period, the first neural network is configured to generate the synthetic image to match a target image beyond a first threshold of accuracy, and the third neural network is configured to match the latent feature vector beyond a second predetermined threshold of accuracy.

According to some embodiments, the trained synthetic image generation system may be used to store input images in a compressed data structure of a latent feature vector. According to some embodiments, the trained synthetic image generation system may be used to modify input images to conform to one or more image classification requirements. According to some embodiments, the trained encoder may be utilized to generate a latent feature vector representation of the input image, which may be translated in vector space to determine a modified latent feature vector conforming to the one or more image classification requirements. The modified latent feature vector may be provided to the trained generator, which may generate a synthetic image that conforms to the one or more image classification requirements. According to some embodiments, the latent feature vector transformation may comprise a logistic regression from an initial latent feature vector to a target latent feature vector having one or more image classifiers associated with the one or more image classification requirements.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
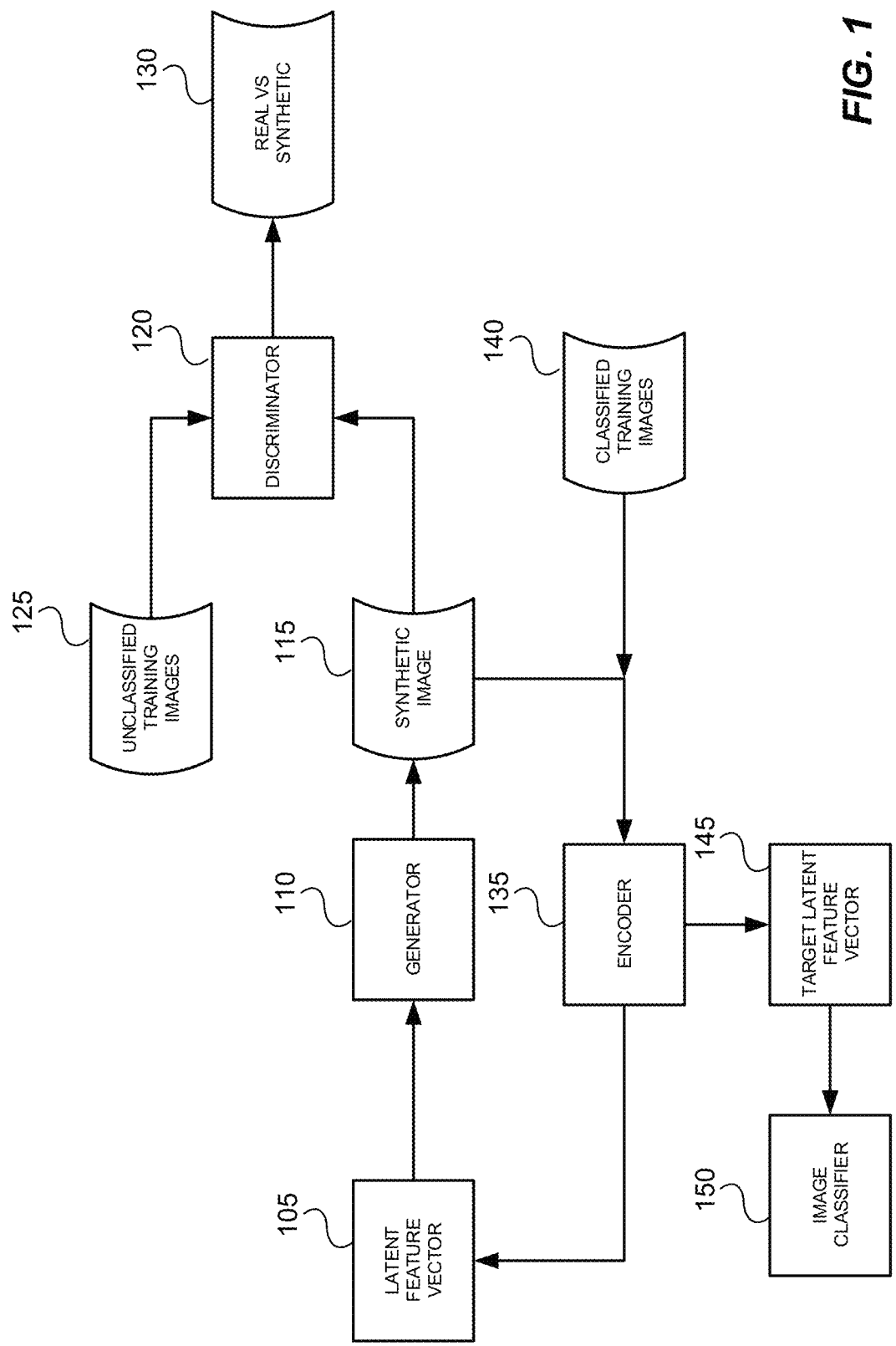
FIG. 1 is a representation of a neural network architecture for training a generative adversarial network to generate synthetic images, in accordance with some embodiments.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for training and utilizing a novel generative adversarial neural network to produce synthetic images. In some embodiments, the generative adversarial network may include a plurality of neural networks. For example, the proposed generative adversarial neural network may include a generator, a discriminator, and an encoder. During training of the proposed generative adversarial network, the generator may be configured to accept an input of a latent feature vector and generate a synthetic image. The resultant synthetic image may be passed to the discriminator neural network, which may be configured to receive training images and determine whether a given image is a real image (e.g., belonging to a set of training images) or whether the image is synthetic (e.g., synthetically generated by the generator). The generator and the discriminator models may be trained in an adversarial relationship, where an improvement in the accuracy of one has an adverse impact on the training of the other. The encoder may be configured to receive labeled training images (e.g., images that have been manually labeled with one or more classifiers) and synthetic images as inputs, and recover the latent feature vector used by the generator to produce any given synthetic image. Additionally, the encoder may be configured to generate target latent feature vectors based on the labeled training images, which enables the system to manipulate synthetic images to conform to one or more classifications. While the generator and the discriminator may be trained in an adversarial relationship, where an improvement in accuracy of one network adversely impacts the other, the generator and the encoder may also be trained in an adversarial relationship. For example, a change to the generator may improve the realism of generated images, but if the encoder cannot respond to accurately recover the latent feature vector upon which the generator operates, the neural network model may be punished by a loss function associated with the encoder. Thus, according to some embodiments, the disclosed technology may provide a system configured to continually improve its ability to generate synthetic images to be indistinguishable from training images while simultaneously preserving the model's ability to regenerate target images, because the encoder guarantees that images produced by the generator are not only realistic (e.g., based on the discriminator output), but also that the generated synthetic images are accurately tied to the latent feature vector (e.g., based on the encoder accurately recovering the latent feature vector). Accordingly, the disclosed technology may provide a system configured to continually improve its ability to generate synthetic images that meet one or more image classification requirements, which has been challenging for existing systems and methods. For example, after completion of a training period, the system may be configured to receive a given image as an input, determine a latent feature vector that represents the given image, manipulate the latent feature vector to comply with one or more image classification requirements, and use the modified latent feature vector as an input to the generator to generate a synthetic image that complies with the one or more image classification requirements. According to some embodiments, the proposed system may be configured to generate synthetic images of vehicles. According to some embodiments, the trained system may be configured to modify one or more features of the input image (e.g., an image of a blue Honda Accord taken outdoors in natural lighting conditions) to generate a synthetic image (e.g., an image of a red Honda Accord in a photobooth with studio lighting). According to some embodiments, the system may be configured to transform the synthetic image by manipulating one or more of transforming a color of a vehicle in a vehicle image, changing an orientation of a vehicle from a first orientation to a second orientation in the vehicle image, transforming lighting characteristics of the vehicle image, transforming background characteristics of the vehicle image, and/or transforming body style characteristics of a the vehicle in the vehicle image. According to some embodiments, the trained model may be configured to generate synthetic vehicle images that are completely novel, i.e., not based on a given input image but generated directly from the latent feature vector space.

Although various embodiments may be described with respect to a system, a non-transitory computer-readable medium, and a method, it is contemplated that embodiments with identical or substantially similar features may alternatively be implemented as methods, systems, and/or non-transitory computer-readable media.

In some embodiments, the system may implement an attention mechanism as part of the training cycle for the generator and the discriminator of the proposed generative adversarial network. Generally, synthetic images generated by existing generative adversarial networks can create high-resolution image details only as a function of spatially localized points in lower resolution feature maps. The addition of an attention mechanism allows the proposed generative adversarial network model to generate synthetic images that take cues from all feature locations. Additionally, the discriminator is enhanced by way of the attention mechanism to enable verification that details generated by the generator in distant portions of the image are consistent with each other.

According to some embodiments, the novel generative adversarial network is enhanced by the encoder neural network. A traditional generative adversarial network includes a generator and discriminator trained in an adversarial relationship. The generator is iteratively trained to generate synthetic images that closely approach a given "real" training image. The discriminator is iteratively trained to distinguish the generated synthetic images from the training images. Training of the generator model begins with a randomly generated vector. The generator receives the randomly generated vector (i.e., the latent feature vector) and generates a synthetic image based on the randomly generated vector. The synthetic image is passed to the discriminator, which determines whether the image is real or synthetic. However, traditional generative adversarial network have a drawback that once the model is iteratively trained, there is little to no control over the features of the generated synthetic image. Traditional methods of manipulating features of a synthetic image in a generative adversarial network require a synthetic image to be generated based on an initial feature vector and compared to a target image having the desired features. The synthetic image and the target image must be classified by a separate neural network classification model to determine whether the synthetic image includes the desired features. The resultant classifier arrays must be compared to each other, the initial feature vector must be modified based on the comparison, and the synthetic image must be regenerated based on the modified initial feature vector. This process must be repeated for thousands of iterations until the synthetic image includes the desired features found in the target image. This process is computationally expensive, hard to automate, and requires significant human manipulation of the models to achieve quality results. However, the addition of the encoding model in the proposed generative adversarial network completely circumvents this costly process. The proposed encoder, after completion of training, is capable of generating a latent feature vector for any given input image. The latent feature vector may be passed from the encoder to the generator of the model and will always produce a synthetic image identical to the given input image. Accordingly, the encoder allows for any given input image to be stored in the latent feature vector space. Additionally, once the encoder is trained, the encoder is configured to receive labeled training images (e.g., manually labeled with desired image classifiers) and to generate target latent feature vectors for any desired feature (e.g., vehicle color, vehicle orientation, vehicle model, lighting and background conditions, etc.). Target latent feature vectors allow the encoder to associate image classifiers from the labeled images to the vector space. These target latent feature vectors produced by the encoder allow the system (e.g., generator) to generate synthetic images that have desired target features without the requirement of thousands of manual training iterations, significantly improving the disclosed systems and methods over traditional generative adversarial networks.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 is a representation of a neural network architecture for training a generative adversarial network to generate synthetic images, in accordance with some embodiments. Referring to FIG. 1, a training cycle may begin with a randomly generated latent feature vector 105. During training a latent feature vector 105 may be randomly generated. Each randomly generated latent feature vector 105 may be used as an input for a generator 110 to operate on. Each distinct latent feature vector 105 may result in a unique synthetic image to be generated by the generator 110. For example, even a small change to initial parameters of latent feature vector 105 may cause an entirely different synthetic image to be generated by the generator 110. Generator 110 may be a generative neural network of a generative adversarial neural network. During training, generator 110 receives a randomly generated latent feature vector 105 as an input and outputs a synthetic image 115. According to some embodiments, the synthetic image 115 may be an image of a vehicle, but the techniques described herein may work for any class of image subjects, including articles of clothing, human faces, images of other vehicles (e.g., boats, airplanes), etc. According to some embodiments, during a training cycle, generator 110 is trained to output synthetic images 115 that attempts to mimic real images. In order to train generator 110 to output realistic synthetic images 115, a discriminator 120 is trained simultaneously with generator 110. For example, during a training cycle, unclassified training images 125 are provided to discriminator 120 as an input. Additionally, synthetic images 115 produced by generator 115 are also provided as an input to discriminator. Unclassified training images 125 may include only unlabeled images. After receiving unclassified training images 125 and synthetic images 115 as an input, discriminator 120 is configured to determine whether a given image is real (e.g., belonging to one of unclassified training images 125) or a synthetic image 115 (e.g., image generated by generator 110) in image discrimination 130. The image classification may include whether a given image is a real image (e.g., that the given image belongs to the class of training images 125) or whether the given image is synthetic image 115 generated by generator 110.

As part of a training cycle, encoder 135 also receives the synthetic images 115 generated by generator 110. During training, encoder 135 is configured to take synthetic image 115 as an input and output the latent feature vector 105 that was used by generator 110 to produce the synthetic image 115. Accordingly, encoder 135 is configured to recover the initial value of the randomly generated latent feature vector 135 that resulted in the output of synthetic image 115 by generator 110. Additionally, after the encoder 135 is trained, the encoder may be configured to receive classified training images 140 (e.g., images with manually labeled target features or image classifications), generate target latent feature vectors 145 associated with the training images, and develop image classifier models 150 based on associating the manually labeled image classifiers with the resultant latent feature vectors. The resultant latent feature vectors may be stored as target latent feature vectors 145 which enable the system to manipulate latent feature vectors 105 to conform to one or more image classification requirement. Image classifier 150 may be configured to determine how labeled features of classified training images 140 are represented in vector space by generating target latent feature vectors 145, which allow the system to manipulate latent feature vectors 105 through logistic regression to create synthetic images 115 that conform to one or more image classification requirements. Classified training images 140 may include labeled features such as a color of a vehicle present in the image, an orientation of the vehicle present in the image, the year, make, and model characteristics of the vehicle in the image, whether the image was taken in outdoor conditions, whether the image was taken in a photobooth/studio with photobooth/studio lighting, etc. Accordingly, targeted image classification models 150 may be created for any desired image classification requirement (e.g., a first model to change vehicle color, a second model to change vehicle make and model, a third model to change vehicle orientation, a fourth model to transform background and lighting characteristics of an image, etc.). According to some embodiments, image classification models 150 may be trained on classified training images 140, and once trained, may be applied to any class of images, including real images and synthetic images.

Additionally, encoder 135 uses image classifier 150 to determine the relationship between the labeled features of classified training images 140 and the latent feature vector space. According to some embodiments, latent feature vector 105 may be a vector having at least 7,000 dimensions. In a preferred embodiment, latent feature vector 105 may be a vector having at least 50,000 dimensions. According to some embodiments, the latent feature vector may be represented by a 512×14 matrix. According to some embodiments, the latent feature vector may be represented by a 512×1200 matrix.

Training cycles may iteratively continue until generator 110 produces synthetic images 115 that match one or more unclassified training images 125 beyond a first predetermined threshold of accuracy as determined by the trained discriminator 120. Training cycles may iteratively continue until the encoder recovers the latent feature vector 105 for any given synthetic image 115 beyond a second predetermined threshold of accuracy. Once all aspects of the novel generative adversarial network have been trained (e.g., generator 110, discriminator 120, and encoder 135). The system may be capable of receiving any input image and encoding the given input image into the latent feature vector space. This allows the system to store image data in a compressed vector format, providing numerous benefits, including decreasing the need for storage space, and increasing computational efficiency based on operating on a compressed data structure such as latent feature vector 105 rather than having to store large image files. Additionally, with the addition of the novel encoder 135 into the proposed generative adversarial network model, the system is able to generate an image classifier model 150 that correlates features of classified training images 140 to features represented in the latent vector space by target latent feature vectors 145. Accordingly, after the model has been trained, the system may receive any image and calculate its representation in vector space using encoder 135 to generate the latent feature vector 105. Additionally, because the encoder can correlates the labeled features of classified training images 140 to target latent feature vectors 145, the system is capable of receiving an image, transforming the image into vector space by using encoder 135 to generate the representative latent feature vector 105 for the given image, and manipulate the latent feature vector to conform to image classification requirements provided to the system (e.g., by performing a logistic regression to transform the latent feature vector 105 to conform to a target latent feature vector 145 without changing any other aspect of the resultant image). For example, as described in more detail with respect to FIGS. 2-3, by manipulating values of latent feature vector 105, the system can produce modified latent feature vectors 105 that may be inputted into generator 110 to produce synthetic images meeting certain image classification requirements. For example, the trained model may be provided an image of a vehicle taken outdoors, the trained encoder may generate a latent feature vector 105 that represents the outdoor vehicle image, and the system may translate the latent feature vector 105 in vector space to include certain desired features, such as producing an image of the same vehicle, but taken in a photobooth with realistic indoor lighting conditions. In this case, the image classification requirement may be the production of a synthetic image of the given vehicle, but modified to be an indoor photobooth photo with realistic indoor lighting. The modified latent feature vector 105 may be provided to the trained generator 110, which may produce synthetic image 115 that has the desired properties (e.g., conforms to the given image classification requirements).

Figure 2:
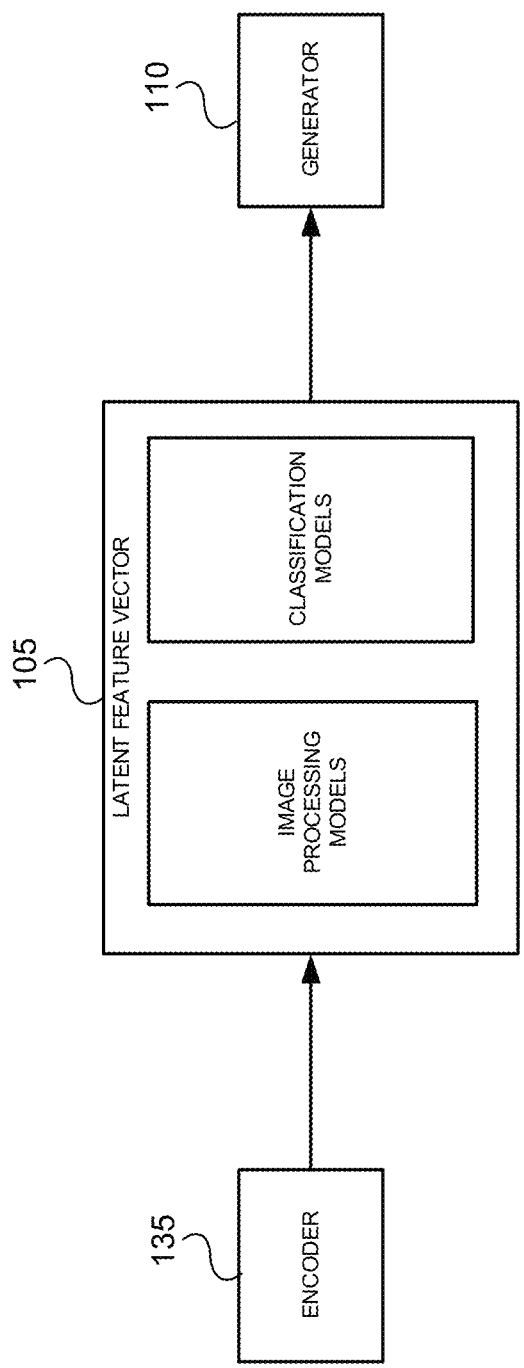
FIG. 2 is a representation of an example model methodology for generating a latent feature vector by a trained encoder neural network and using the latent feature vector to generate a synthetic image with a trained generator neural network, in accordance with some embodiments.

FIG. 2 is a representation of an example model methodology for generating a latent feature vector by a trained encoder neural network and using the latent feature vector to generate a synthetic image with a trained generator neural network, in accordance with some embodiments. Referring now to FIG. 2, trained encoder 135 may receive an input image from a user of the system who wishes to generate a synthetic image 115. The trained encoder may generate a latent feature vector 105 that represents the input image in vector space. Because encoder 135 learns to represent features of any given image in vector space (using the image classifier 150 and generated target latent feature vectors 145), the latent feature vector 105 includes image processing models which allow for the latent feature vector 105 to be manipulated (e.g., changing a color of vehicle in the input image, changing a vehicle orientation, changing lighting and/or background conditions, or even changing the year/make/model of a the vehicle in the input image) as well as image classification models, which classify features found within the given image (e.g., a year/make/model of a vehicle, whether the image was taken outside or inside, what kind of lighting conditions are present in the image, etc.). This information-rich latent feature vector 105 may be provided to generator 110 without any modifications and trained encoder 110 would produce an output synthetic image substantially identical to the input image. Alternatively, the latent feature vector 105 may be manipulated to conform to one or more user-provided image classification requirements, and the modified latent feature vector 105 may be provided to trained generator 110 to produce a synthetic image that conforms to the user-provided image classification requirements (e.g., converting an outdoor vehicle image to an indoor vehicle image, changing the color of the vehicle, etc.).

Figure 3:
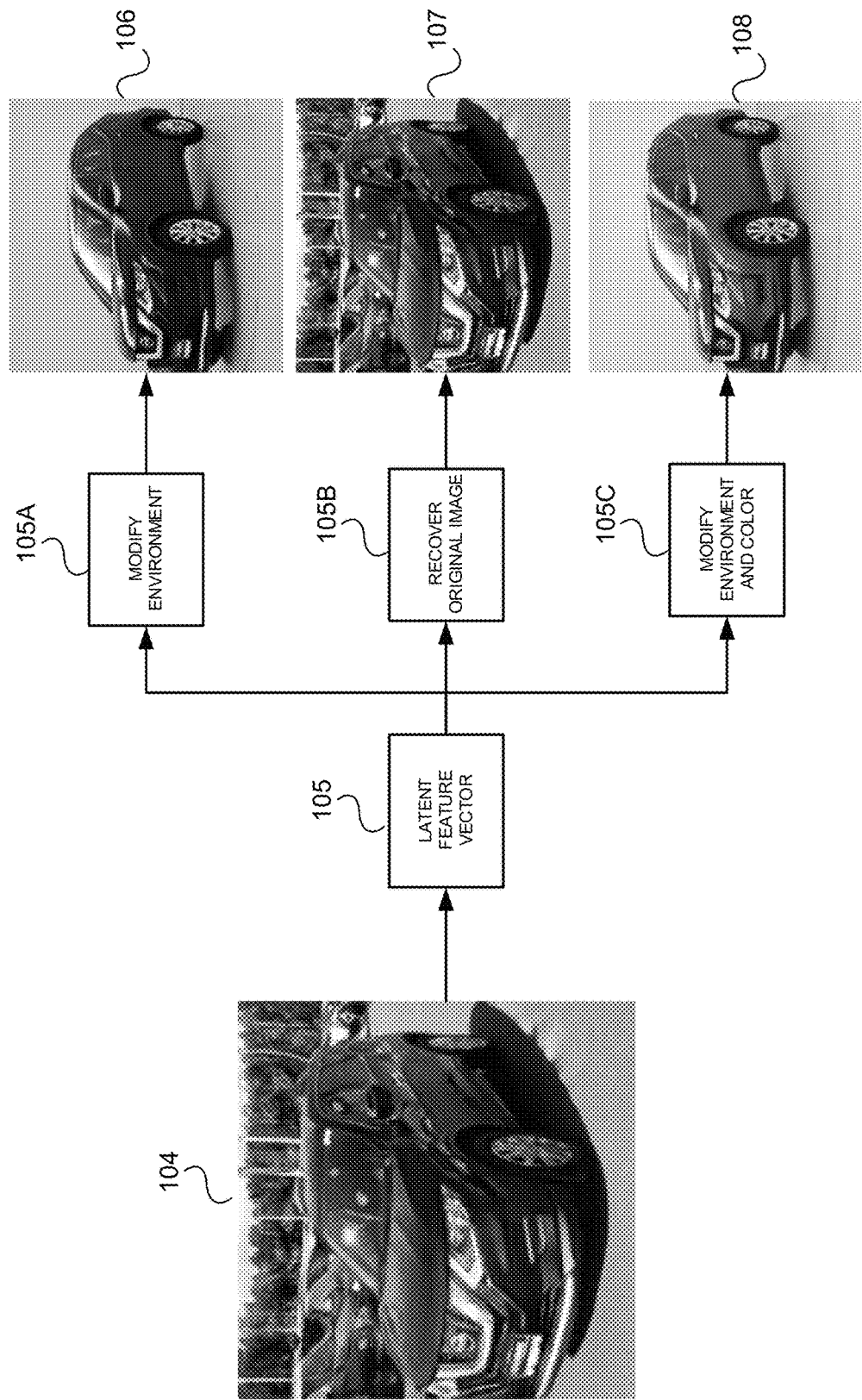
FIG. 3 is a representation of an example model methodology for generating synthetic images by modifying at least one classifier associated with the latent feature vector, in accordance with some embodiments.

FIG. 3 is a representation of an example model methodology for generating synthetic images by modifying at least one classifier associated with the latent feature vector, in accordance with some embodiments. Referring now to FIG. 3, input image 104 is an exemplary input image that may be provided by a user of the system. Input image 104 may be passed to the trained encoder 135, which generates a latent feature vector 105. Latent feature vector 105 may include the image processing models and image classifications models as described in more detail with respect to FIG. 2. Latent feature vector 105 may be a compressed vector representation of the input image 105. For example, images uploaded by users of the system may be stored in latent feature vector 105 representation, in order to save system storage space and to enable faster and more convenient image manipulations directly on the latent feature vector 105. The system may use unmodified latent feature vector 105 to recover the original image 105B. Recovering the original image 105B may be accomplished by passing unmodified latent feature vector 105 to the trained generator 110. Trained generator 110 may receive unmodified latent feature vector 105 and generate synthetic image 107, which is substantially identical to input image 104. However, in some embodiments, it may be desirable to perform one or more manipulations on latent feature vector 105 according to one or more image classification requirements. For example, a user of the system may wish to upload an image of a vehicle to be listed for sale. However, the provided image may be unsuitable for use in a vehicle product listing because the image may have the vehicle in an outside environment with inconsistent lighting. Because latent feature vectors 105 generated by the system all include one or more image classifiers that describe features of the images that may be generated from the latent feature vectors, a given latent feature vector 105 may be modified to comply with one or more image classification requirements. For example, if the desired synthetic image 115 should include an image classification requirement of a studio/photobooth vehicle image having studio lighting characteristics, latent feature vector 105 may be manipulated in vector space to modify the environment 105A of the input image 104. The manipulated latent feature vector 105 may be passed to trained generator 110 which may output synthetic image 106, which may be identical to input image 104 except for the modified environment 105A. According to some embodiments, the manipulation of latent feature vector 105 to comply with one or more image classification requirements may include performing a logistic regression analysis between the unmodified latent feature vector 105, and a target latent feature vector 145 having the desired image classification (as discussed in greater detail with respect to FIG. 6). The latent feature vector 105 may be translated in vector space until the latent feature vector 105 includes an image classifier associated with the image classification requirement. Modifying the latent feature vector 105A to have a studio environment does not change any other image aspect of the image except for the environment. Accordingly, synthetic image 106 may maintain the same color, orientation, and all other features except for the feature specifically targeted in the latent feature vector manipulation. In some embodiments, a user may wish to manipulate more than one features of the input image when creating a synthetic image. For example, the latent feature vector 105 may be manipulated to modify both an environment and a vehicle color 105C. According to some embodiments, the latent feature vector 105 may be manipulated using a logistic regression between the latent feature vector 105 and a target latent feature vector 145 having image classifiers associated with the modified vehicle color and modified vehicle environment. Accordingly, the manipulated latent feature vector 105 may be passed to trained generator 110 which may output synthetic image 108. Synthetic image 108 may be identical to input image 104 except for the features specifically manipulated in the latent vector space (e.g., vehicle environment and vehicle color). Accordingly, entirely customized synthetic vehicle images may be generated from the latent vector space according to one or more image classification requirements. Additionally, according to some embodiments, a user may specify at least one image classification requirement without providing an input image. The system may accordingly generate a synthetic image meeting the at least one image classification requirement directly by selecting a pseudo-randomly generated latent feature vector 105 that complies with the at least one image classification requirement. For example, target latent feature vectors 145 may be stored as default values that comply with certain classification requirements (e.g., by including a respective image feature, such a vehicle body style, make or model, color, etc.). If a user wishes specifies an image classification requirement of a vehicle with a sedan body style, the system may identify each target latent feature vector 145 stored on the system that includes an image classification 150 of the sedan body style. Each identified target latent feature vector 145 may be averaged together to produce a generic latent feature vector that includes an image classification of a sedan body style. The resultant generic latent feature vector may be passed to the trained generator 110 which produces a synthetic image 115 that conforms to the image classification requirement of a vehicle having a sedan body style. The user may add additional classification requirements and under a similar process a new generic latent feature vector may be determined based on the stored target latent feature vectors 145, and a new synthetic image 115 may be generated that includes the classification requirements requested by the user. According to some embodiments, the pseudo-randomly generated "generic" latent feature vectors may be determined according to a logistic regression model as described in more detail with respect to FIG. 6, which can transform a latent feature vector 105 to take on an image classification exhibited by a target latent feature vector 145.

Figure 4:
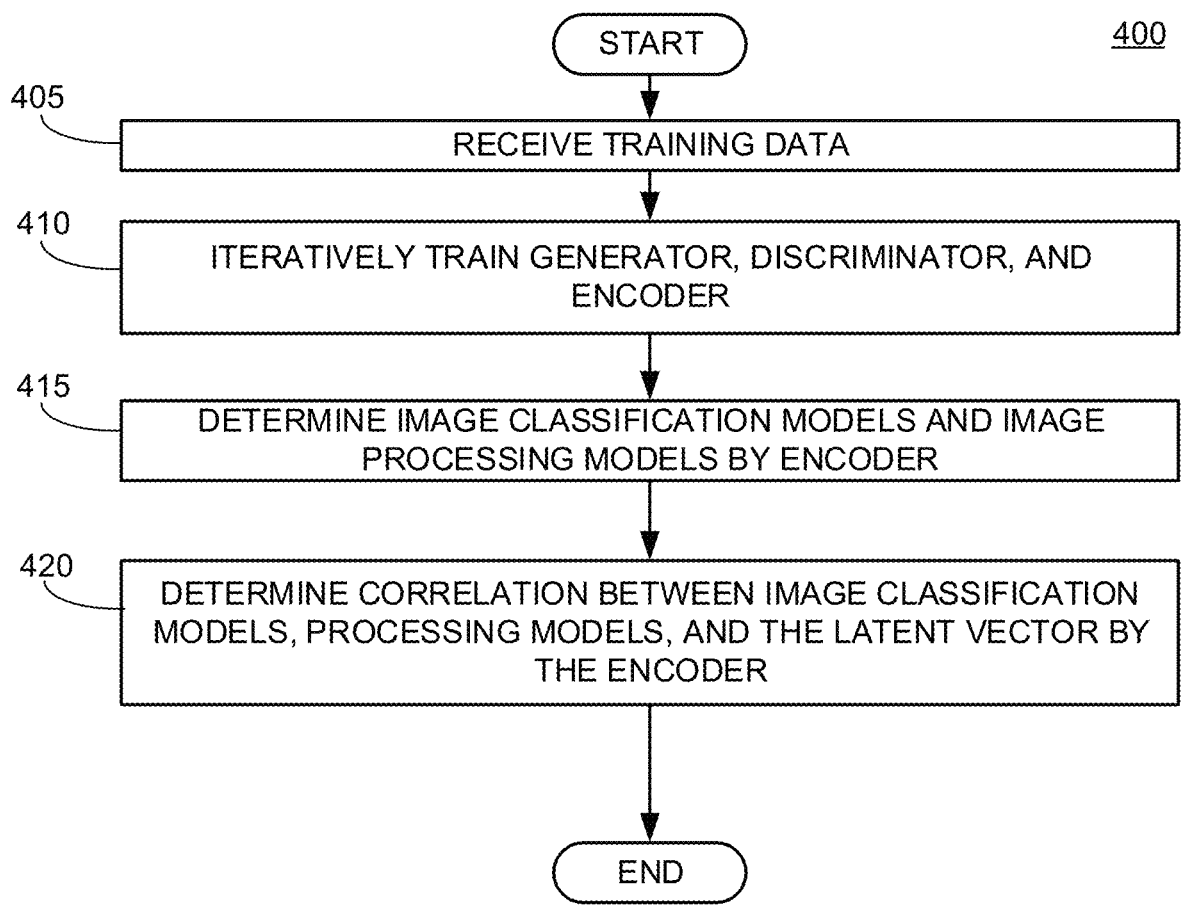
FIG. 4 is a flowchart of an exemplary method of determining a correlation between image classification models, image processing models, and the latent feature vector, in accordance with some embodiments.

FIG. 4 is a flowchart of an exemplary method of determining a correlation between image classification models, image processing models, and the latent feature vector, in accordance with some embodiments. Referring now to FIG. 4, method 400 may begin with receiving training data in step 405. As described in more detail with respect to FIG. 7, the training data may be received from a training image repository that includes both classified training images and unclassified training images. Classified training images may include images that have been manually reviewed and labeled with one or more image classifiers, which represent features contained within the training images (e.g., whether the image contains a vehicle, what year, make, and/or model the vehicle is, the background characteristics of the image, the lighting characteristics of the image, etc.). Unclassified training images may be training images that have not been manually classified. According to some embodiments, unclassified training images may be used to train discriminator 120 to determine whether an image is real or synthetic. According to some embodiments classified training images may be used to generate image classifier models 150 and the target latent feature vectors 145. According to some embodiments, unclassified training images may be used to train discriminator 120 to determine whether an image is real or synthetic, but may not be used to determine the image classifier models 150 or target latent feature vectors 145 for a given image classification requirement.

In step 410, the system may iteratively train the generator, discriminator, and encoder of the novel generative adversarial network model. The iterative training process is described in more detail with respect to FIG. 5. The iterative training process enables the generator to produce realistic synthetic images based on an input latent feature vector, enables the encoder to determine an image classification for each synthetic image produced, and enables the discriminator to determine whether a given image is a synthetic image or a training image received as part of the training data, and enables the encoder to recover the latent feature vector for any synthetic image generated by generator 110.

In step 415, the system may determine image classification models and image processing models by the encoder and associated image classifier 150. For example, classified training images may (e.g., images that have been manually labeled with image classifications) may be passed to trained encoder 135, which generates the image classifier models 150 that correlate the manually labeled features from the classified training images to target latent feature vectors 145. As described in more detail with respect to FIG. 2 and FIG. 6, image processing models allow for the latent feature vector 105 to be manipulated (e.g., changing a color of vehicle in the input image, changing a vehicle orientation, changing lighting and/or background conditions, or even changing the year/make/model of a the vehicle in the input image) and image classification models classify features found within the given image (e.g., a year/make/model of a vehicle, whether the image was taken outside or inside, what kind of lighting conditions are present in the image, etc.).

In step 420, the encoder may determine a correlation between the image classification models and image processing models determined by encoder 135 and image classification model 150 and the latent vector recovered by encoder 135. Accordingly, the latent feature vector 105 generated by encoder 135 may be manipulated by altering values of the recovered latent feature vector 105, for example, by performing a logistic regression analysis to take on one or more classifications present in a target latent feature vector 145, as described in more detail with respect to FIG. 6. After step 420, method 400 may end.

Figure 5:
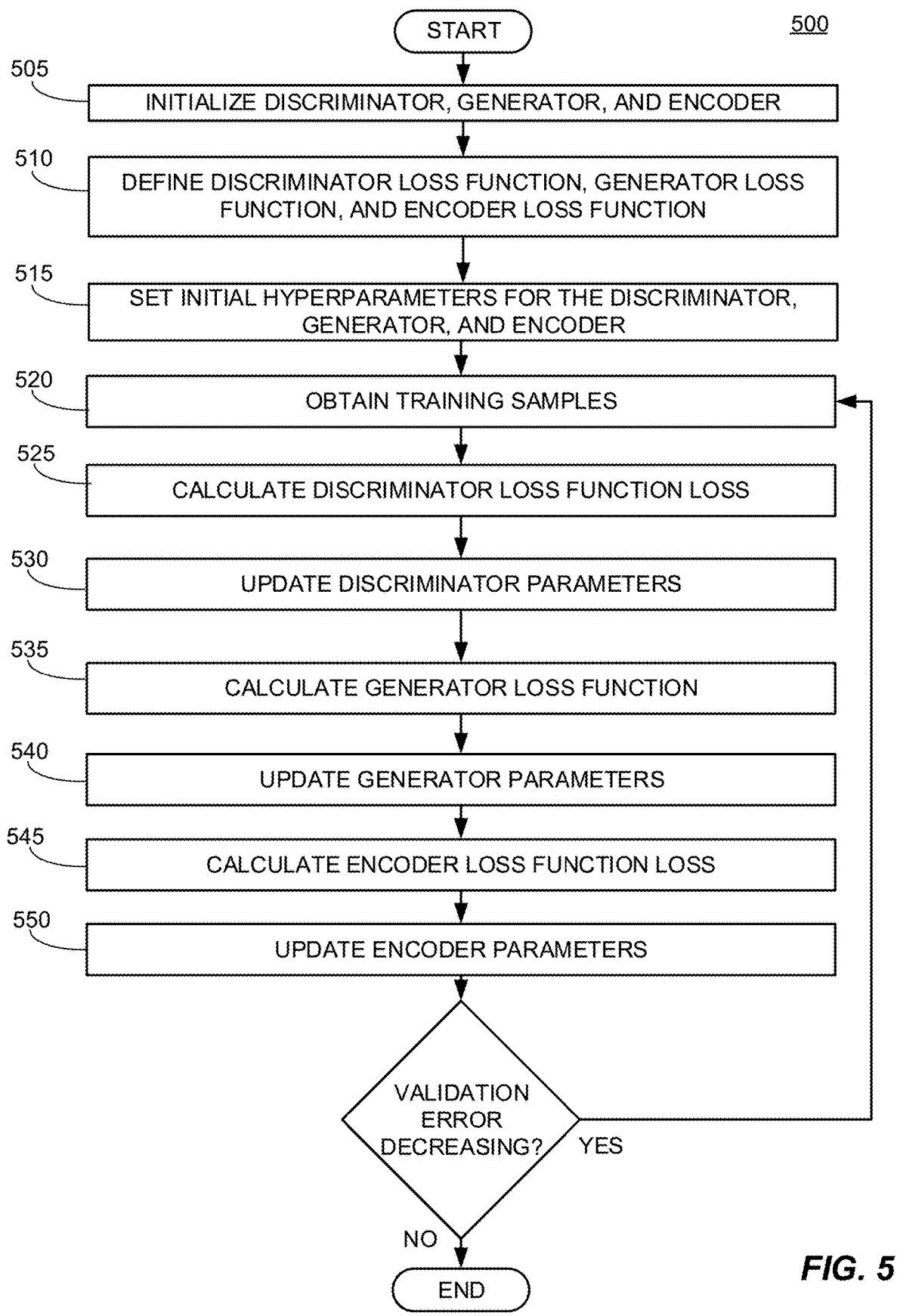
FIG. 5 is a flowchart of an exemplary method of iteratively training a generator, discriminator, and encoder of the generative adversarial network, in accordance with some embodiments.

FIG. 5 is a flowchart of an exemplary method of iteratively training a generator, discriminator, and encoder of the generative adversarial network, in accordance with some embodiments. Referring now to FIG. 5, in step 505, the system may initialize the discriminator, generator, and encoder. This may include defining and initializing the neural network architectures of the discriminator, generator, and encoder. According to some embodiments, a generator neural network may include at least a mapping network that is configured to generate a latent feature vector based on an input of a randomly sampled point from latent vector space. According to some embodiments, the mapping network may include eight fully connected layers and may be a standard deep neural network. The generator may also include a plurality of up-sampling blocks configured to receive the latent feature vector 105 as an input and incorporate it into each block of the plurality of up-sampling blocks. According to some embodiments, a discriminator neural network may be a convolutional neural network that classifies images and determines whether the images are synthetic (e.g., generated by the generator), or a "real" training image. According to some embodiments, the discriminator neural network may be any neural network appropriate for image classification. According to some embodiments, the encoder neural network may include at least one down-sampling block configured to down-sample an input synthetic image 115 in order to recover the latent feature vector 115.

In step 510, the system may define a loss function for the discriminator, a loss function for the generator, and a loss function for the encoder. According to some embodiments, the generator may attempt to minimize a loss function given by Equation (1), while the discriminator attempts to maximize the loss function given by Equation (1).

$$E_x[\log(D(x))] + E_z[\log(1-D(G(z)))] \quad (1)$$

In Equation (1), D(x) may represent the discriminator's estimate of the probability that real data instance x is real. $E_x$ may represent the expected value overall real data instances. G(z) may represent the generator's output when given an input of a randomized latent feature vector "z." D(G(z)) may represent the discriminator's estimate of the probability that a synthetic instance is real. $E_z$ may represent the expected value may represent the expected value over all generated synthetic instances G(z). According to some embodiments, the generator cannot affect the log(D(x)) term, so the generator loss function may simplify to log(1−D(G(z)). According to some embodiments, the generator loss function may be modified to instead maximize log(D(G(z))). According to other embodiments, the generator and discriminator may be modified to instead calculate a Wasserstein Loss.

According to some embodiments, the encoder neural network may be a VGG19 convolutional neural network. The loss function of the encoder may be given as a Euclidean distance between feature representations of a reconstructed image and a reference image. According to some embodiments, the loss function of the encoder may be a log loss function. According to some embodiments, the loss function of the encoder may be a mean square error loss function. According to some embodiments, the encoder loss function may be given by Equation (2).

$$\text{Encoder Loss} = \frac{1}{W_{i,j}H_{i,j}} \sum_{x=1}^{W_{i,j}} \sum_{y=1}^{H_{i,j}} \left(\varphi_{i,j}(I^{HR})_{x,y} - \varphi_{i,j}(G_{\theta_G}(I^{LR}))_{x,y}\right)^2 \quad (2)$$

$W_{i,j}$ and $H_{i,j}$ may describe the dimensions of feature maps within the encoder neural network, $\varphi_{i,j}$ may refer to the feature map obtained by the encoder by the j-th convolution and before the i-th maxpooling layer within the encoder network, $G_{\theta_G}(I^{LR})$ may represent the reconstructed latent feature vector, and/HR may represent the original latent feature vector.

In step 515, the system may set initial hyperparameters for the discriminator neural network, the generator neural network, and the encoding neural network. For example, the system may set hyperparameters for learning rates, decay rates, and batch sizes for each of the discriminator neural network, generator neural network, and encoder neural network. According to some embodiments, the dimensionality of the input latent feature vector 105 may be another hyperparameter adjusted for the system. In step 515, the system may also set initial parameters for each of the discriminator neural network, the generator neural network, and the encoding neural network. According to some embodiments, the initial parameters may be initiated according to a Xavier initialization with either a uniform distribution or a normal distribution. Parameters for each of the discriminator neural network, the generator neural network, and the encoding neural network may be updated after each training cycle for the respective neural network based on a loss function minimization. According to some embodiments, a loss function is minimized according to a gradient descent calculation, which allows the system to iteratively adjust weights of the initial parameters until a minima for each loss function is determined.

Batch size represents how many training images are running through the system at a time. Batch size may not have a direct effect on model accuracy, but does affect the speed at which the model trains. Batch size may be adjusted to be as large as possible to increase the speed of training with a limit on batch size established by the processing capacity of the graphical processing unit being used to train the model.

Learning rate may represent how quickly parameters of the model adjusted during training of the model. A low learning rate increases the time it takes to train the model but may increase the accuracy of the model once the model is sufficiently trained. A high learning rate may reduce the system's ability to minimize the loss function because weights of the neural networks are adjusted with a step size too large to adequately tune the model. Accordingly, in some embodiments, a learning rate decay rate may be implemented. A decay rate adjusts the learning rate of the system such that the learning rate is high in initial training cycles to increase the speed of training while the loss function value is still high, and reduce the speed of training once the loss function approaches a minima to increase accuracy of the model training.

In step 520, the system may obtain training samples. For example, as described in more detail with respect to FIG. 7, the system may receive training images from a training image repository (e.g., training image repository 720), which may include both classified training images and unclassified training images. According to some embodiments, only unclassified training images are used to train the system and classified training images are used to train an image classifier after the generator, discriminator, and encoder have completed training. Once the model is trained, classified training images may be used to generate image classification models 150 and target latent feature vectors 145. As described in more detail with respect to FIG. 7, the classified training images may be training images that have been manually labeled with target image features. Trained encoder 135 may generate target latent feature vectors 145 which allow the system to associate the specific features from the labeled training images with values of target latent feature vectors 145. Additionally, generator may generate a first synthetic image (or a first batch of synthetic images) in a first training cycle, and discriminator may attempt to verify whether the first synthetic image (or first batch of synthetic images) is synthetic or whether it is a training image.

In step 525, the discriminator loss function may be calculated based on an input of the first synthetic image and a first training image according to Equation (1). In some embodiments, the input may be a first batch synthetic images and a first batch of training images in accordance with the batch size set as an initial hyperparameter of model training. In step 530, the parameters for the discriminator are updated based on minimizing the loss function of Equation (1). According to some embodiments, the parameters are adjusted based on a back-propagation calculation, which involves finding partial derivatives for each layer of the discriminator neural network with respect to the discriminator loss function. According to some embodiments, updating the parameters is based on finding a loss function minima using a gradient descent technique.

In step 535, the generator loss function may be calculated according to Equation (1). Based on the results of minimizing the generator loss function, one or more generator parameters may be updated in step 540. The parameters for the generator may be updated in a similar way as described with respect to step 530.

In step 545, the encoder loss function loss may be calculated according to Equation (2). After the encoder loss function is calculated, one or more encoder parameters may be modified for the encoder in step 550 in a similar way as described with respect to step 530. Steps 520-550 may define a single training cycle for the synthetic image generation system.

Figure 7:
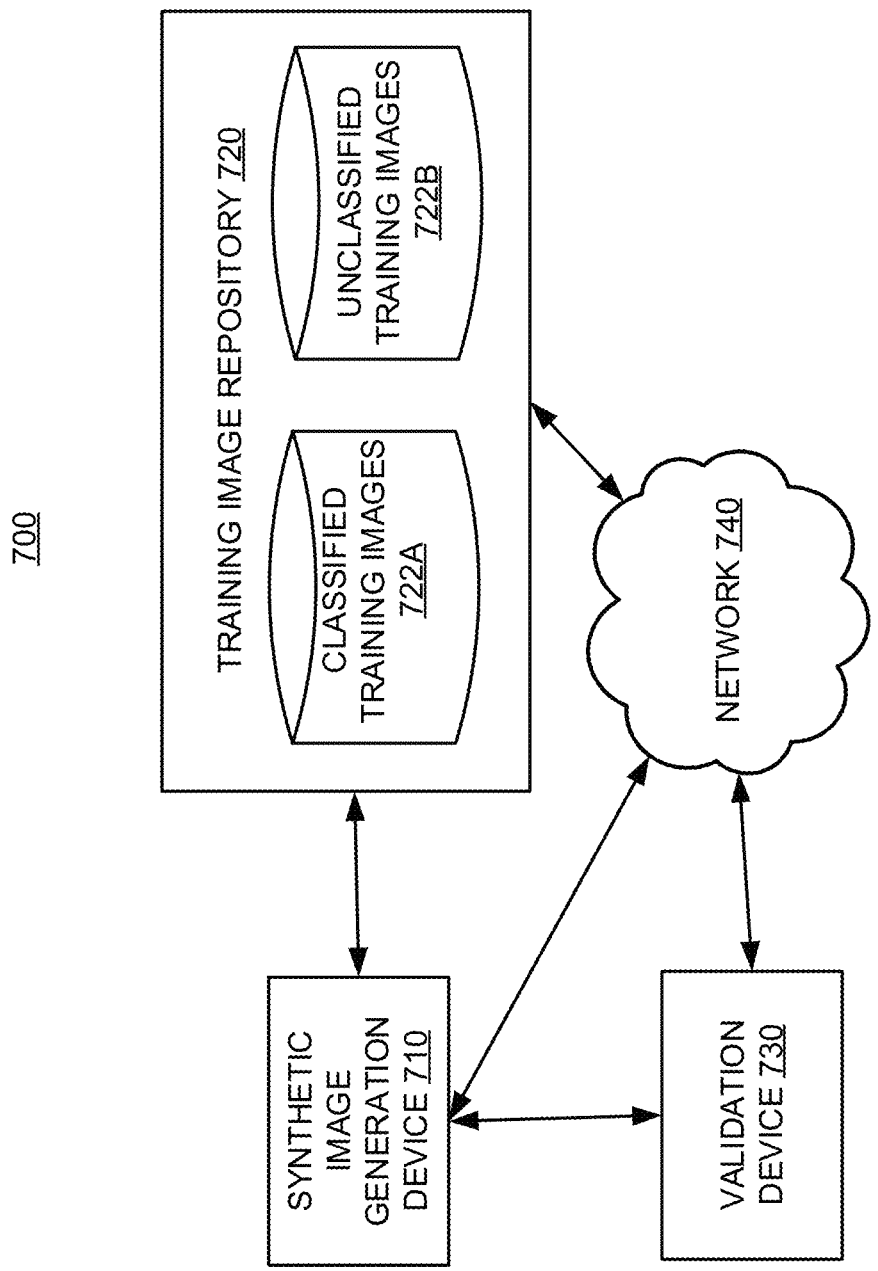
FIG. 7 is a diagram of an exemplary system that may be used for training a synthetic image generation system or implementing a trained synthetic image generation system to generate synthetic images, in accordance with some embodiments.

In decision block 555, the system may determine (e.g., using a validation device 730, as described in more detail with respect to FIG. 7), whether the training error is decreasing for the given generator neural network, discriminator neural network, and the encoder neural network. When the system determines that the training error is decreasing, method 500 returns to step 520 to complete another training cycle, to iteratively train and optimize the model. When the training error is no longer decreasing (e.g., after a number of training cycles have been completed), method 500 may end and the model may be trained. According to some embodiments, a trained synthetic image generation model may be trained to generate a synthetic image by the generator to match a target (e.g., training image) beyond a first threshold of similarity. According to some embodiments, a trained synthetic image generation model may be trained to recover the latent feature vector (e.g., match an input latent feature vector) by the encoder beyond a second threshold of similarity. After decision block 555, method 500 may end. According to some embodiments, the training loss may be determined to be at a minimum when the loss function of the generator approaches a minimum and the discriminator loss function begins to increase. This may represent a point at which the generator has been sufficiently trained such that the discriminator begins to struggle to identify whether a given input image is real (e.g., a training image) or synthetic (e.g., generated by generator 135). According to some embodiments, the training error for the system may be determined by calculating one of an inception score and/or an Fréchet Inception Distance (FID) score.

Figure 6:
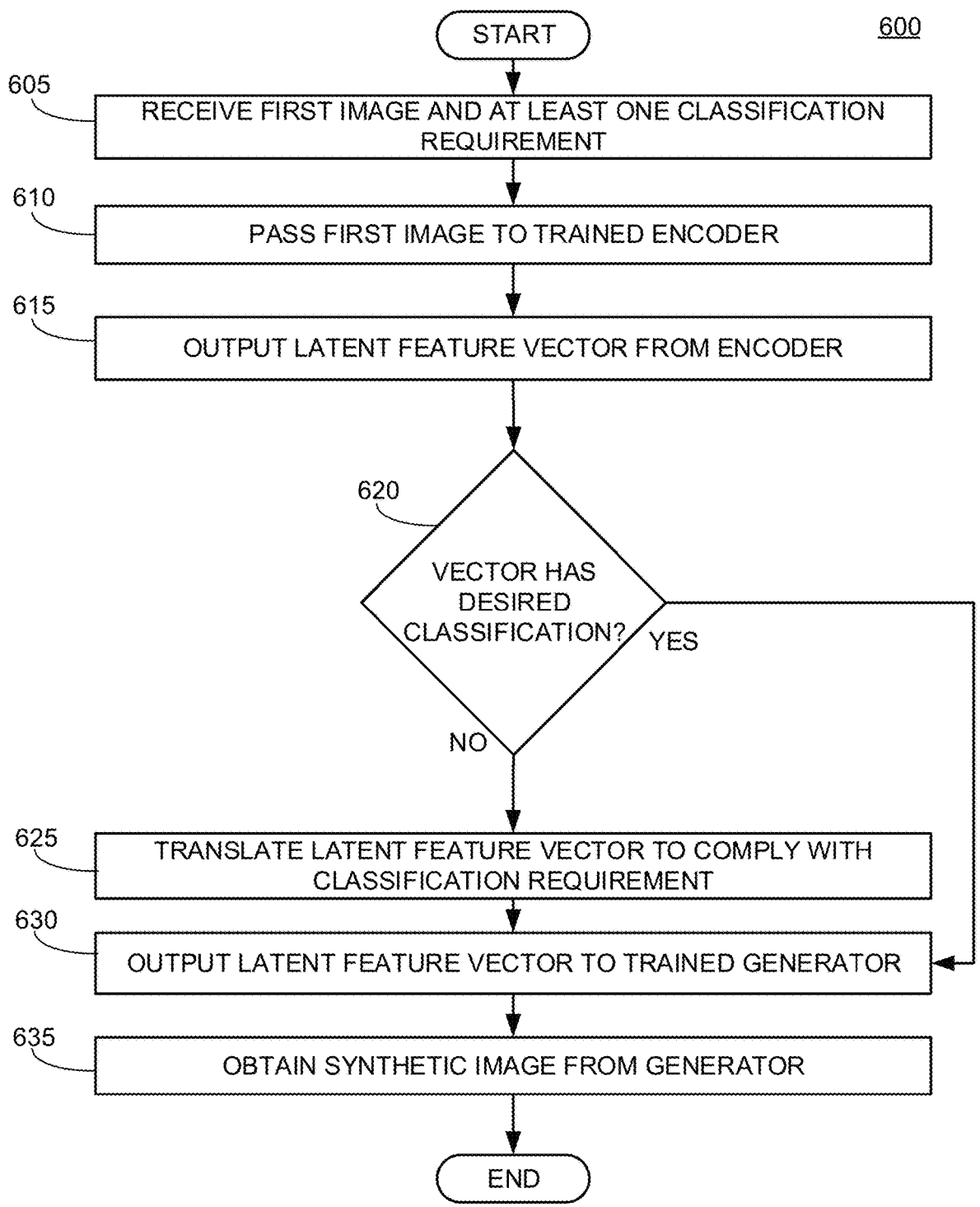
FIG. 6 is a flowchart of an exemplary method of obtaining a synthetic image from a trained synthetic image generation system, in accordance with some embodiments.

FIG. 6 is a flowchart of an exemplary method of obtaining a synthetic image from a trained synthetic image generation system, in accordance with some embodiments. As shown in step 605 in FIG. 6, a trained synthetic image generation system may receive a first image and at least one classification requirement. For example, as described with respect to FIG. 3, an outdoor image of a vehicle may be uploaded to the synthetic image generation system by a user of the system. The user may also provide at least one image classification requirement. For example, the vehicle image may be an outdoor image, but the image classification requirement may be for a requirement for a photobooth image to be generated.

In step 610, the uploaded image may be passed to the trained encoder 135. Trained encoder 135 may generate a latent feature vector 105 representative of the input image. The latent feature vector 105 may include image processing models and image classification models as described in more detail with respect to FIG. 2, which enable the synthetic image generation system to manipulate the latent feature vector to conform to the one or more image classification requirements provided to the system by a user. In step 615, the trained encoder may output a latent feature vector 105 that corresponds to the input image.

In decision block 620, the system may determine whether the generated latent feature vector 105 includes the desired image classification (e.g., does the generated latent feature vector 105) meet the image classification requirement. For example, the latent feature vector 105 may be passed to image classification model 150 to determine whether latent feature vector 105 meets the image classification requirement.

When the system determines that the generated latent feature vector 105 complies with the image classification requirement, the system may move to step 630. When the system determines that the latent feature vector 105 does not comply with the image classification requirement, method 600 may move to step 625. In step 625, the system may translate the latent feature vector to comply with the image classification requirement. According to some embodiments, to determine whether the generated latent feature vector 105 includes the desired image classification, the system may perform a logistic regression analysis between the generated latent feature vector 105 and a target latent feature vector 145 that includes the image classification requirement. For example, after the encoder has been trained (e.g., after the completion of method 500 as described with respect to FIG. 5), a classified training image having the desired labeled feature is passed to trained encoder 135. The resultant target latent feature vector 145 may be passed to image classifier 150. Image classifier 150 may then correlate the labeled features to values of the target latent feature vector 145. The correlation of the labeled features to the values of the target latent feature vector 145 may be determined by running a logistic regression model to determine a slope coefficient for a given image classification requirement (e.g., transformation of vehicle color, orientation, background, lighting, etc.). After the slope coefficient of the logistic regression model is determined by image classifier 150, the generated latent feature vector 105 may be multiplied by the determined coefficient for the image classification requirement and further multiplied by a variable multiplier factor. A plurality of manipulated latent feature vectors are determined for different multiplier values from a predetermined range of multiplier values. Each of the newly generated manipulated latent feature vectors are passed to trained generator 110, which outputs the resultant manipulated images to discriminator 120, which outputs a high value for more realistic images and a lower value for unrealistic images. The manipulated latent feature vector that results in the highest discriminator 120 output value is kept as the manipulated latent feature vector 105.

In step 630, the system may output the latent feature vector 105 to trained generator 110. Generator 110 generates a synthetic image based on the provided latent feature vector 105 that conforms to the image classification requirement. Accordingly, generator 110 generates a synthetic image that complies with the image classification requirement. Returning back to the vehicle example discussed in relation to FIG. 3, the image classification requirement may involve a transformation of an outdoor vehicle image to a studio image with studio quality lighting. Accordingly, the latent feature vector 105 may be translated to comply with the studio image requirement, and the synthetic image 115 may be generated that includes a vehicle identical to the one in the input image except for a translation of the background and lighting characteristics to conform to a studio/photobooth vehicle image. Finally, in step 635, trained generator 110 outputs the desired synthetic image 115 that conforms to the image classification requirement.

FIG. 7 is a diagram of an exemplary system that may be used for training a synthetic image generation system or implementing a trained synthetic image generation system to generate synthetic images, in accordance with some embodiments. The components and arrangements shown in FIG. 7 are not intended to limit the disclosed embodiments as the components are used to implement the disclosed processes and features may vary. In accordance with disclosed embodiments a synthetic image generation system may include a synthetic image generation device 710, a training image repository 720, and a validation device 730, each communicating over a network 740. According to some embodiments, training image repository may be configured to house both classified training images 722A and unclassified training images 722B. The training image repository 720 may be connected to synthetic image generation device 710 either directly or via the network 740. The validation device 730 may be connected either directly to synthetic image generation device 710 or via network 740. Other components known to one of ordinary skill in the art may be included in the synthetic image generation system 700 to process, transmit, provide, and receive information consistent with the disclosed embodiments.

The synthetic image generation device 710 may be a computer-based system. For example, the synthetic image generation device 710 may include a general purpose or notebook computer, a mobile device with computing ability, a server, a desktop computer, tablet, or any combination of these computers and/or affiliated components. The synthetic image generation device 710 may include one or more sensors such as a camera and microphone (i.e., audiovisual monitoring systems), gyroscope and/or a GPS receiver. The synthetic image generation device 710 may be configured with storage that stores one or more operating systems that perform known operating system functions when executing by one or more processors. For example, the operating systems may include Microsoft Windows™, Unix™, Linux™, Apple™ operating systems, Personal Digital Assistant (PDA) type operating systems (e.g. Mircosoft CE.™), or other types of operating systems, nonexclusively. Further, the synthetic image generation device 710 may include communication software that, when executed by a processor, provides communications with the network 740, such as web browser software, tablet, or smart handheld device networking software, etc. The synthetic image generation device 710 may be a device that executes mobile applications, such as a tablet or a mobile device. Although reference is made specifically to the synthetic image generation device 710, a person of ordinary skill in the art would understand that the validation device 730, may have some or all of the components and capabilities of the synthetic image generation device 710. The training image repository 720 may provide the synthetic image generation device 710 access to a repository of training images in order to train a synthetic image generator, according to some of the disclosed embodiments. The training image repository 720 may be a computer-based system including computer system components, such as one or more servers, desktop computers, workstations, tablets, handheld computing devices, memory devices, and/or internal network(s) connecting the components. As shown in FIG. 7, the trained image repository may include one or more databases for housing classified training images 722A and unclassified training images 722B. According to some embodiments, the training images may be images of vehicles having various features.

Network 740 may comprise any type of computer networking arrangement used to exchange data. For example, network 740 may be the Internet, a private data network, or a virtual private network using a public network such as the Internet. Network 740 may also include a public switched telephone network ("PSTN") and/or a wireless network.

Figure 8:
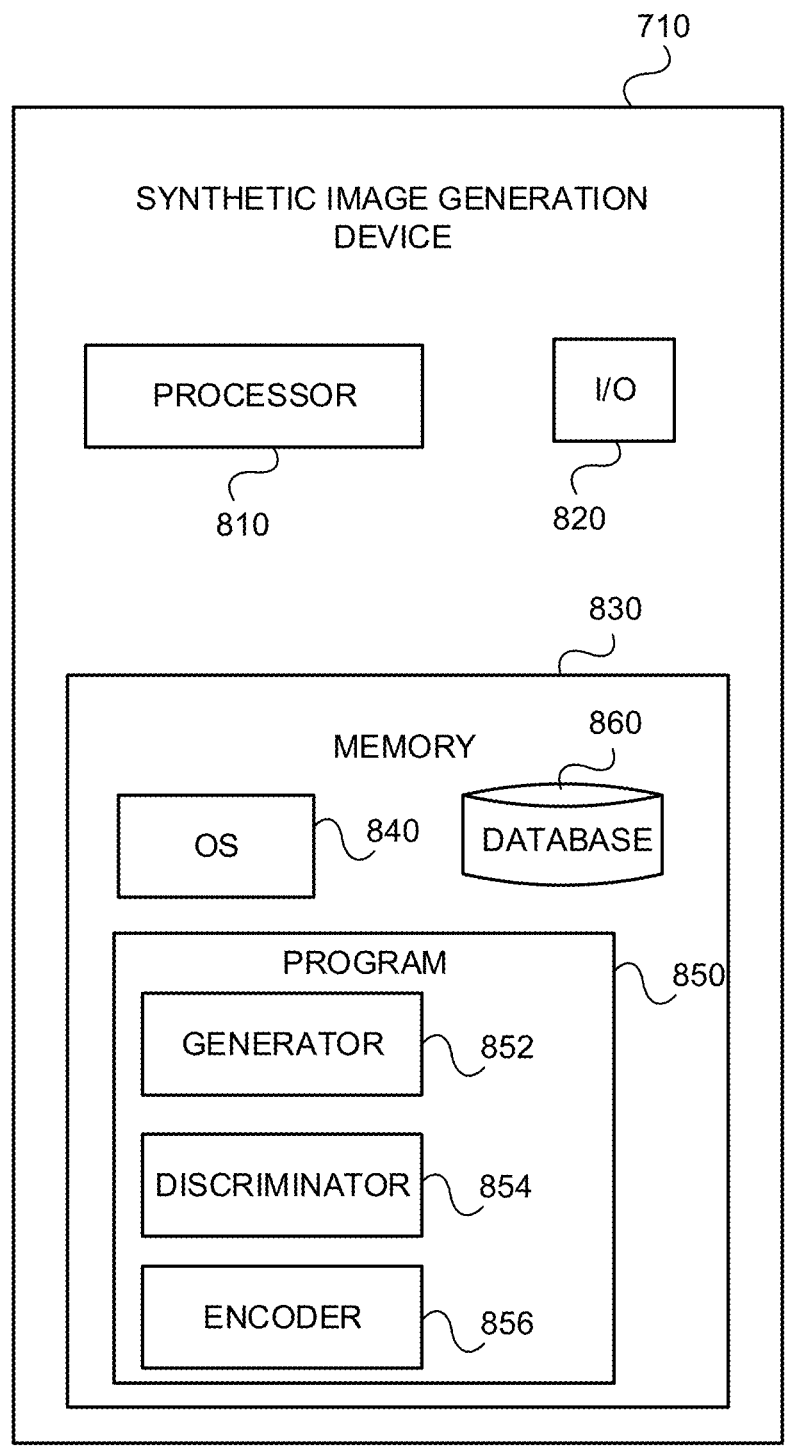
FIG. 8 is a component diagram of an exemplary synthetic image generation device, in accordance with some embodiments.

The synthetic image generation device 710 is shown in more detail in FIG. 8. The validation device 730 may have a similar structure and components that are similar to those described with respect to synthetic image generation device 710. As shown, synthetic image generation device 710 may include a processor 810, an input/output ("I/O") device 820, a memory 830 containing an operating system ("OS") 840 and program(s) 850. For example, synthetic image generation device 710 may be a single server or may be configured as a distributed computer system including multiple servers or computers that interoperate to perform one or more of the processes and functionalities associated with the disclosed embodiments. In some embodiments, the synthetic image generation device 710 may further include a display (or a display interface), a peripheral interface, a transceiver, a mobile network interface in communication with the processor 810, a bus configured to facilitate communication between the various components of the synthetic image generation device 710, and a power source configured to power one or more components of the synthetic image generation device 710. A display may include any conventional display mechanism such as a flat panel display, projector, or any other display mechanism known to those having ordinary skill in the art. In some embodiments, a display, in conjunction with suitable stored instructions, may be used to implement a graphical user interface. In other embodiments, a display may include a display interface configured to receive or communicate with one or more external displays. The synthetic image generation device 710 may further include a sound interface, a camera interface, a telephony subsystem, an antenna interface, and a GPS receiver.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

In some embodiments, a transceiver may be configured to communicate with compatible devices and ID tags when they are within a predetermined range. A transceiver may be, for example, compatible with one or more of: radio-frequency identification (RFID), near-field communication (NFC), Bluetooth®, low-energy Bluetooth® (BLE), WiFi™, ZigBee®, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 810 to communicate with other devices via wired or wireless networks, whether local or wide area, private or public, as known in the art. A power source may be configured to provide an appropriate alternating current (AC) or direct current (DC) to power components.

Processor 810 may include one or more of a microprocessor, microcontroller, digital signal processor, co-processor or the like or combinations thereof capable of executing stored instructions and operating upon stored data. Memory 830 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 830.

Processor 810 may be one or more known processing devices, such as a microprocessor from the Pentium™ family manufactured by Intel™. or the Ryzen™. family manufactured by AMD™. Processor 810 may constitute a single core or multiple core processor that executes parallel processes simultaneously. For example, processor 810 may be a single core processor that is configured with virtual processing technologies. In certain embodiments, processor 810 may use logical processors to simultaneously execute and control multiple processes. Processor 810 may implement virtual machine technologies, or other similar known technologies to provide the ability to execute, control, run, manipulate, store, etc. multiple software processes, applications, programs, etc. In another embodiment, processor 810 may include a multiple-core processor arrangement (e.g., dual or quad core) that is configured to provide parallel processing functionalities to allow synthetic image generation device 710 to execute multiple processes simultaneously. One of ordinary skill in the art would understand that other types of processor arrangements could be implemented that provide for the capabilities disclosed herein.

Synthetic image generation device 710 may include one or more storage devices configured to store information used by processor 810 (or other components) to perform certain functions related to the disclosed embodiments. In one example, synthetic image generation device 710 may include memory 830 that includes instructions to enable processor 810 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, synthetic image generation device 710 includes memory 830 that includes instructions that, when executed by processor 810, perform one or more processes consistent with the functionalities disclosed herein. Methods, systems, and articles of manufacture consistent with disclosed embodiments are not limited to separate programs or computers configured to perform dedicated tasks. For example, synthetic image generation device 710 may include memory 830 that may include one or more programs 850 to perform one or more functions of the disclosed embodiments. Moreover, processor 810 may execute one or more programs 850 located remotely from the synthetic image generation device 710. For example, the synthetic image generation device 710 may transmit instructions to one or more components of the validation device 730 (e.g., to validate whether the synthetic image generation device 710 has completed training for generating synthetic images).

According to some embodiments, programs 850 may include programming for enabling a generator program 852 for providing a generator neural network, a discriminator program 854 for providing a discriminator neural network, and an encoder program 856 for providing an encoder neural network. Each of generator program 852, discriminator program 854, and encoder program 856 may include programming to enable the initialization, training, and implementation of aspects of the synthetic image generation system 700, in accordance with disclosed embodiments.

Memory 830 may include one or more memory devices that store data and instructions used to perform one or more features of the disclosed embodiments. Memory 830 may also include any combination of one or more databases controlled by memory controller devices (e.g., server(s), etc.) or software, such as document management systems, Microsoft SQL databases, SharePoint databases, Oracle™ databases, Sybase.™. databases, or other relational databases. Memory 830 may include software components that, when executed by processor 810, perform one or more processes consistent with the disclosed embodiments.

Synthetic image generation device 710 may also include one or more I/O devices 820 that may comprise one or more interfaces for receiving signals or input from devices and providing signals or output to one or more devices that allow data to be received and/or transmitted by synthetic image generation device 710. For example, synthetic image generation device 710 may include interface components, which may provide interfaces to one or more input devices, such as one or more keyboards, mouse devices, touch screens, track pads, trackballs, scroll wheels, digital cameras, microphones, sensors, and the like, that enables synthetic image generation device 710 to receive data from one or more users. In other exemplary embodiments, the I/O devices 820 may serve as the sound interface and/or the camera interface to present information to a user and capture information from a device's environment including instructions from the device's user. As additional examples, input components may include an accelerometer (e.g., for movement detection), a magnetometer, a digital camera, a microphone (e.g., for sound detection), an infrared sensor, an optical sensor, and a GPS receiver.

In exemplary embodiments of the disclosed technology, the synthetic image generation device 710 may include any number of hardware and/or software applications that are executed to facilitate any of the operations. In example implementations, one or more I/O interfaces facilitate communication between the synthetic image generation device 710 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the synthetic image generation device 710 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of synthetic image generation device 710 may include a greater or lesser number of components than those illustrated.

In example embodiments of the disclosed technology, synthetic image generation system 700 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Exemplary Use Cases

The following exemplary use cases describe examples of a typical system flow pattern. They are intended solely for explanatory purposes and not in limitation. In the present examples, the synthetic image generation system may have already undergone training. A first use may be for a compressed image storage and generation system. The system may receive an input image and rather than storing the input image in a typical image format (e.g., JPEG, PNG, TIFF, etc.), the system may provide the input image to the trained encoder. The trained encoder may convert the input image into a latent feature vector. The latent feature vector may be stored in place of the input image. Storage of images in latent feature vector form may provide numerous advantages. For example, latent feature vectors may be smaller in size than the input images, and allow for the conservation of processing power associated with storing and manipulating large image file sizes. Additionally, storing images in the latent feature vector format allows for the direct manipulations of the stored vector representations to generate synthetic images that are (i) identical to the input image or (ii) manipulated images that comply with an image classification requirement (e.g., changing an vehicle color, changing an image background, rotating a vehicle's orientation in a given image, etc.).

In another application, a user of the synthetic image generation system may not provide an input image but only provide one or more image classification requirements. For example, a user of the system may wish to research his or her ideal vehicle and what that vehicle would look like. The user may provide certain requirements, for example, the user may wish to see vehicles offered in a wagon configuration and red color. The trained synthetic image generation system may determine a pseudorandom latent feature vector that complies with the one or more image classification requirements (e.g., by including one or more classifiers in the pseudorandom latent feature vector associated with the given image classification requirements). The pseudorandom latent feature vector may be passed to the trained generator, and the trained generator may output a synthetic image of an entirely novel vehicle image that meets these requirements. A separate analysis may be then be performed to determine a real vehicle most similar to the synthetic vehicle image. Accordingly, the trained synthetic image generation system may be used to help user's determine which vehicles to consider when making a purchase decision by first generating an "ideal" vehicle entirely synthetically.

In yet another application, a user of the system may provide an input image of a vehicle he or she wishes to list for sale. However, the input image may be inappropriate for a direct listing because, for example, the vehicle image is taken outdoors in poor lighting conditions. The trained synthetic image generation system may receive the image and an image classification requirement to translate the input image into an image having studio lighting characteristics. Accordingly, the trained encoder may determine a latent feature vector that complies with the provided image classification requirement (e.g., by determining a latent feature vector that includes one or more classifiers associated with the image classification requirement) and pass the resultant latent feature vector to the trained generator to create a synthetic image having all the desired characteristics of the input image, but with the addition of studio quality lighting and a photobooth background.

In yet another application, a user of the system may provide an input image of a vehicle, and may wish to modify the input image of the vehicle to see what the vehicle would be like with additional components or features. For example, the user may provide an image of a Silver Honda Accord. The user may wish to add or remove a sunroof from the input image to determine how the vehicle would look with the addition or removal of that feature. Alternatively, the user may wish to see what the vehicle may look like with a different set of wheels, in a different color, or any other variation of the vehicle for which an target latent feature vector 145 has been previously generated (e.g., based on one or more classified training images provided to trained encoder 135). Accordingly, the user may generate multiple modified images that are identical to the input image except for the requested modification (e.g., sunroof, wheels, vehicle color, etc.).

Examples of the present disclosure relate to systems and methods for synthetic image generation. In one aspect, a system for training a synthetic image generator is disclosed. The system may implement a method according to the disclosed embodiments. The system may include a first neural network configured to generate a synthetic image based on a latent feature vector. The system may include second neural network configured to distinguish a real image from the synthetic image and output a classification of the synthetic image. The system may include a third neural network configured to receive the synthetic image and recover the latent feature vector. The first neural network may output the synthetic image to the second neural network and the third neural network. The first neural network and the second neural network may train in an adversarial relationship with each other during a training period. The first neural network and the third neural network may train in a collaborative relationship with each other during the training period. The first neural network may be configured to generate the synthetic image to match a target image beyond a first predetermined threshold of accuracy after the completion of the training period. The third neural network may be configured to match the latent feature vector beyond a second predetermined threshold of accuracy after completion of the training period.

In some embodiments, the first neural network is further configured to generate the synthetic image based on selected features of the latent feature vector. In some embodiments, after completion of the training period the system may be further configured to receive a first image and a first image classification requirement associated with the first image. The system may pass the first image to the third neural network and output a first image latent feature vector. The system may modify the first image latent vector to comply with the first image classification requirement. The system may pass the modified first image latent vector to the second neural network. The system may obtain a first synthetic image from the second neural network, wherein the first synthetic image complies with the first image classification requirement.

In some embodiments, the synthetic image is based on manipulating at least one feature of the latent feature vector. In some embodiments, the third neural network is further configured to associate the classification of the synthetic image with the recovered latent feature vector. In some embodiments, the latent feature vector is randomly generated during the training period.

In some embodiments, the first neural network may include a mapping network configured to generate the latent feature vector and a plurality of up-sampling blocks configured to generate features of the synthetic image based on the latent feature vector.

In some embodiments, the synthetic image is an image of a vehicle. In some embodiments, the manipulation may further include at least one manipulation selected from transforming a color of the vehicle in a vehicle image, changing an orientation of the vehicle from a first orientation to a second orientation in the vehicle image, transforming lighting characteristics of the vehicle image, transforming background characteristics of the vehicle image, and transforming body style characteristics of the vehicle in the vehicle image.

In some embodiments, the third neural network may include at least one down-sampling block configured to generate the latent feature vector from the synthetic image outputted by the first neural network wherein the third neural network is trained to minimize a loss function associated with recovering the latent feature vector from the synthetic image.

In another aspect, a method for training a synthetic image generator is disclosed. The method may include training a generative neural network to generate a synthetic image based on a latent feature vector. The method may include training a discriminative neural network to distinguish a real image from the synthetic image and output one or more classifiers associated with the synthetic image. The method may include training an encoding neural network to recover the latent feature vector based on an input of the synthetic image. The method may include the generative neural network outputting the synthetic image to the discriminative neural network and the encoding neural network. The method may include a training period during which the generative neural network and the discriminative neural network train in an adversarial relationship with each other and the generative neural network trains in a collaborative relationship with the encoding neural network. The method may include the generative neural network configured to generate the synthetic image to match a target image beyond a first predetermined threshold of accuracy after the completion of the training period. The method may include the encoding neural network configured to match the latent feature vector beyond a second predetermined threshold of accuracy after completion of the training period.

In some embodiments, the generative neural network is further configured to generate the synthetic image based on selected features of the latent feature vector. In some embodiments, the synthetic image is based on manipulating at least one feature of the latent feature vector. In some embodiments, the encoding neural network may be further configured to associate the one or more classifiers associated with the synthetic image with the recovered latent feature vector. In some embodiments, the latent feature vector is randomly generated during the training period. In some embodiments, the synthetic image is an image of a vehicle. In some embodiments, the manipulation may include at least one manipulation selected from transforming a color of the vehicle in a vehicle image, changing an orientation of the vehicle from a first orientation to a second orientation in the vehicle image, transforming lighting characteristics of the vehicle image, transforming background characteristics of the vehicle image, and transforming body style characteristics of the vehicle in the vehicle image.

In another aspect, a system for training a synthetic image generator is disclosed. The system may include a first neural network configured to generate a synthetic image based on a latent feature vector. The system may include a second neural network configured to distinguish a real image from the synthetic image and output a classification of the synthetic image. The system may include a third neural network configured to receive the synthetic image and recover the latent feature vector. The first neural network may output the synthetic image to the second neural network and the third neural network. During a training period, the first neural network may be configured to generate the synthetic image to match a target image beyond a first predetermined threshold of accuracy after completion of the training period, and the third neural network may be configured to match the latent feature vector beyond a second predetermined threshold of accuracy after completion of the training period.

In some embodiments, the third neural network may be further configured to associate the classification of the synthetic image with the recovered latent feature vector. In some embodiments, the first neural network may be further configured to generate the synthetic image based on selected features of the latent feature vector.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described herein with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described herein with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

I claim:

1. A system for generating synthetic images, the system comprising:
    one or more processors;
    a memory in communication with the one or more processors and storing instructions that, when executed by the one or more processors, are configured to cause the system to:
        simultaneously train a first neural network, a second neural network, and a third neural network, the first neural network configured to generate a first synthetic image approximating a real image using a first latent feature vector, the second neural network configured to distinguish a synthetic image from the real image, and the third neural network configured to transform the synthetic image into a second latent feature vector approximating the first latent feature vector;
        provide a target image comprising a target feature to the third neural network;
        generate, via the third neural network, a target latent feature vector comprising the target feature;
        transform the second latent feature vector into a third latent feature vector by performing a logistic regression between the second latent feature vector and the target latent feature vector;
        provide the first neural network with the third latent feature vector; and
        generate, via the first neural network, a second synthetic image, the second synthetic image based on the third latent feature vector, the second synthetic image comprising the target feature.

2. The system of claim 1, wherein the first neural network is further configured to generate synthetic images based on selected features of the latent feature vector.

3. The system of claim 1, wherein the second synthetic image and the first synthetic image are identical except for the target feature.

4. The system of claim 3, wherein the second synthetic image is based on manipulating at least one feature of the second latent feature vector.

5. The system of claim 1, wherein performing the logistic regression further comprises determining a slope coefficient associated with the logistic regression and multiplying the second latent feature vector by the determined slope coefficient, thereby transforming the second latent feature vector into the third latent feature vector.

6. The system of claim 5, wherein performing the logistic regression further comprises multiplying the third latent feature vector by a variable multiplier factor.

7. The system of claim 1, wherein the first neural network comprises:
    a mapping network configured to generate latent feature vectors; and
    a plurality of up-sampling block configured to generate features of synthetic images based on the latent feature vectors.

8. The system of claim 4, wherein the first synthetic image and the second synthetic image are images of a vehicle.

9. The system of claim 8, wherein the manipulation further comprises at least one manipulation selected from transforming a color of the vehicle in a vehicle image, changing an orientation of the vehicle from a first orientation to a second orientation in the vehicle image, transforming lighting characteristics of the vehicle image, transforming background characteristics of the vehicle image, and transforming body style characteristics of the vehicle in the vehicle image.

10. The system of claim 1, wherein the third neural network comprises
    at least one down-sampling block configured to generate latent feature vectors from synthetic images generated by the first neural network; and
    wherein the third neural network is trained to minimize a loss function associated with recovering the latent feature vectors from the synthetic images.

11. A method for generating synthetic images, the method comprising:
    receiving one or more target images comprising a labeled feature;
    converting the one or more target images into one or more target latent feature vectors using a trained encoding neural network;
    receiving a first image, the first image not comprising the labeled feature;
    converting the first image into a first latent feature vector using the trained encoding neural network;
    transforming the first latent feature vector into a second latent feature vector by performing a logistic regression between the first latent feature vector and the one or more target latent feature vectors; and
    generating a first synthetic image using a trained generative neural network based on the second latent feature vector, wherein the first synthetic image comprises the labeled feature.

12. The method of claim 11, wherein the generative neural network is further configured to generate synthetic images based on selected features of latent feature vectors.

13. The method of claim 12, wherein the first synthetic image is based on manipulating at least one feature of the first latent feature vector.

14. The method of claim 11, wherein performing the logistic regression further comprises determining a slope coefficient associated with the logistic regression and multiplying the first latent feature vector by the determined slope coefficient, thereby transforming the first latent feature vector into the second latent feature vector.

15. The method of claim 11, wherein the first image and the first synthetic image are identical except for the labeled feature.

16. The method of claim 13, wherein the first synthetic image is an image of a vehicle.

17. The method of claim 16, wherein the manipulation comprises at least one manipulation selected from transforming a color of the vehicle in a vehicle image, changing an orientation of the vehicle from a first orientation to a second orientation in the vehicle image, transforming lighting characteristics of the vehicle image, transforming background characteristics of the vehicle image, and transforming body style characteristics of the vehicle in the vehicle image.

18. A system for training a synthetic image generator, the system comprising:
one or more processors; and
a memory in communication with the one or more processors and storing instructions that, when executed by the one or more processors, are configured to cause the system to:
simultaneously train a first neural network, a second neural network, and a third neural network, the first neural network configured to generate a first synthetic image approximating a real image using a first latent feature vector, the second neural network configured to distinguish a synthetic image from the real image, and the third neural network configured to transform the synthetic image into a second latent feature vector approximating the first latent feature vector;
generate, via the second neural network, a classification of the first synthetic image;
receive a first image classification requirement;
modify one or more features of the second latent feature vector based on comparing the first image classification requirement to the classification;
provide the modified second latent feature vector to the first neural network; and
generate, by the first neural network, a resultant synthetic image that conforms to the first image classification requirement.

19. The system of claim 18, wherein modifying one or more features of the second latent feature vector further comprises performing a logistic regression between the second latent feature vector and a target latent feature vector associated with the first image classification requirement.

20. The system of claim 18, wherein the memory includes instructions that when executed by the one or more processors, are configured to cause the system to generate the resultant synthetic image based on selected features of the second latent feature vector.

* * * * *